May 11, 1965  H. J. WOOLSLAYER ETAL  3,183,019
TRAILER RUNNING GEAR
Original Filed Feb. 5, 1962

3,183,019
TRAILER RUNNING GEAR
Homer J. Woolslayer, Cecil Jenkins, and Charles D. Iddings, Tulsa, Okla., assignors to Lee C. Moore Corporation, Pittsburgh, Pa., a corporation of Pennsylvania
Original application Feb. 5, 1962, Ser. No. 170,984, now Patent No. 3,162,464, dated Dec. 22, 1964. Divided and this application Oct. 2, 1964, Ser. No. 404,999
2 Claims. (Cl. 280—124)

This invention relates to running gear for the rear ends of trailers, and more particularly to running gear in which there is at least one short axle at each side of the trailer, with a wheel on each end of the axle. This application is a division of our copending application, Serial Number 170,984, filed February 5, 1962.

It is common practice to provide the rear ends of heavy trailers with at least two axially aligned wheels at each side of the trailer. Each pair of wheels are mounted on the opposite ends of a short axle, the central portion of which is rigidly connected to an axle housing rotatable around a trunnion that extends lengthwise of the trailer. If tandom axles are used, the trunnions are at the opposite ends of a walking beam pivotally connected to the trailer frame on a transverse axis. As the trailer travels over a road or field the axles can rock back and forth on their trunnions as one wheel or another passes over a rise or through a depression. This rocking or tilting of the axles permits the load to be distributed substantially uniformly on all of the tires. However, when the trailer is turned, the load is greatly increased on one tire on each axle as that tire scuffs against the ground. At the same time, the axle may be tilted so much that the other tire carried by it will rub against the frame. These things wear the tires unduly. If the turn is quite sharp and the load great, there is even danger that the flattening and scuffing sideways of a tire may cause it to come off the wheel.

It is among the objects of this invention to provide a trailer running gear, in which free rotation of the axles around their trunnions is prevented, in which tilting of the axles on their trunnions is controlled, in which there is more equal loading of the tires on curves than heretofore, in which scuffing of the tires against the ground and trailer frame is reduced, and in which all of these things are accomplished in a relatively simple manner.

In accordance with this invention an axle housing is rotatably mounted on the trunnion of a rigid member that extends lengthwise of an overlying trailer frame, to which it is connected. An axle is secured to the housing and extends across it. The opposite ends of the axle are formed to receive wheels equipped with tires. Connected with the axle housing and its supporting member are controlled yielding means for continually resisting turning of the housing on the trunnion in either direction from a predetermined normal position.

The invention is illustrated in the accompanying drawings, in which.

Figure 2:
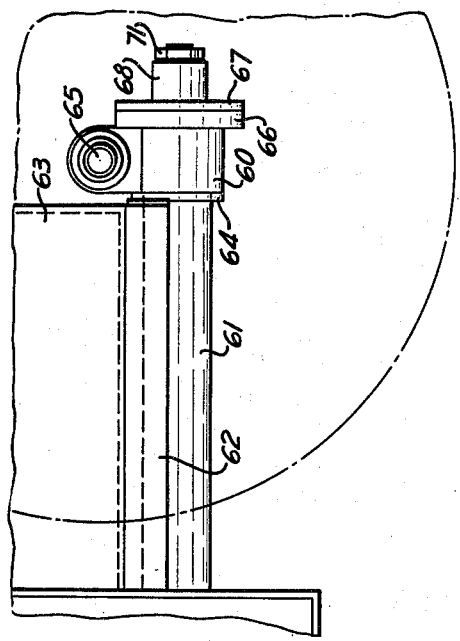
FIG. 2 is a side view of the running gear.
Figure 3:
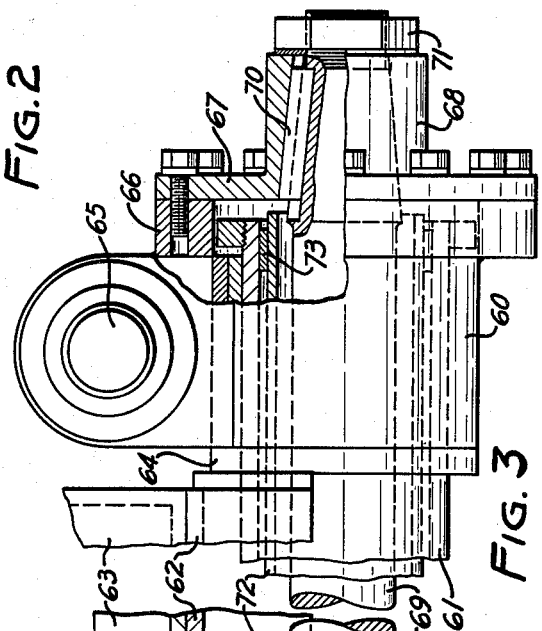
FIG. 3 is an enlarged fragmentary side view, partly broken away in section.
Figure 1:
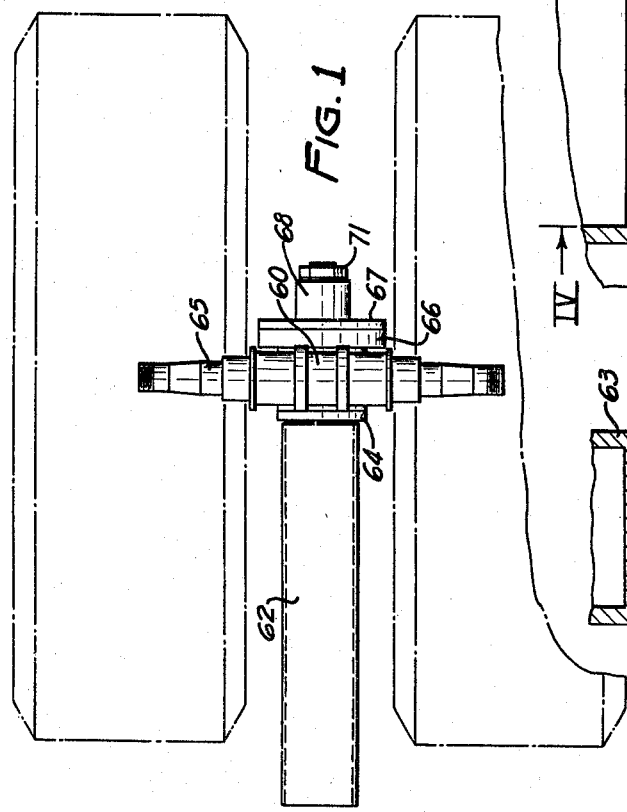
FIG. 1 is a plan view of our running gear at one side of the back of a trailer, with the tires shown in dotted lines.
Figure 4:
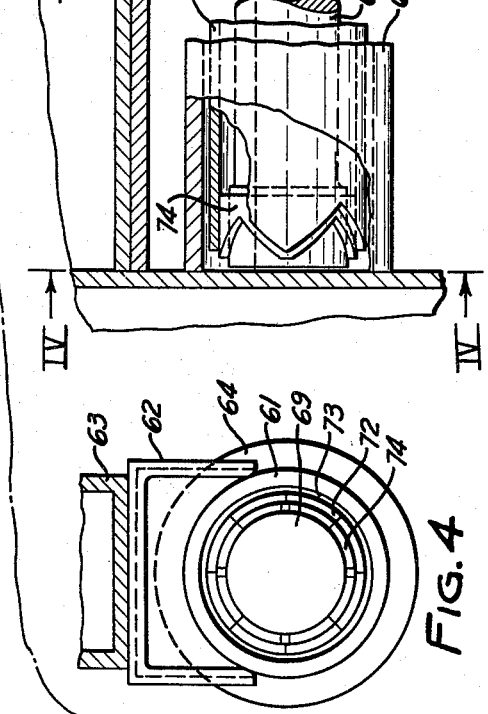
FIG. 4 is an end view of the running gear taken on the line IV—IV of FIG. 3.

Referring to the drawings, a support for an axle housing 60 is a relatively short stiff horizontal tube 61 extending lengthwise of the overlying trailer frame, to which the tube is connected near one side of the rear end. A similar tube (not shown) supports the opposite side of the trailer frame.

A channel 62 may be welded to the top of the tube for the double purpose of reinforcing the tube and forming a flat surface on which a bolster 63 under the overlying trailer frame can be secured. Of course, the channel also keeps the tube from turning on its axis. Near its outer or rear end the tube is encircled by a flange 64, between which and the end of the tube the tube forms a trunnion on which the axle housing 60 is rotatably mounted. The housing has a sleeve-like body encircling the tube, and the top of the housing rigidly supports a short axle 65 extending crossways of the tube and having opposite ends for receiving a pair of rubber tired wheels.

With the construction described thus far, which is more or less conventional, the axles would be free to rotate any amount around the supporting tube 61. As explained above, heretofore unrestrained rocking of the axles would permit the tires to scuff excessively while the trailer was going around a corner, it would produce severe unequal deflection of the tires, and it would also create the danger of some of the tires being pulled off the wheels on sharp turns. It is a feature of this invention that these shortcomings are avoided by adding means to the running gear to restrain turning of the axle housings on the supporting tubes without eliminating all rocking of the axles. Accordingly, a bolting ring 66 is welded to the outer end of the housing so that a flange plate 67 can be attached to it. The tapered socket 68 projecting from the flange plate receives the tapered outer end of a torsion bar 69 held rigidly in the socket by a key 70 and a nut 71 on the end of the bar. This bar may be only about half as long as the ones previously described, but its effective length and flexibility are increased by a torsion sleeve 72 encircling the bar within the tube. The torsion bar extends forward in tube 61 to a point near its front end, but the effective length and flexibility of the torsion bar are increased by a torsion sleeve 72 encircling the bar within the tube. The outer end of the sleeve is welded to the tube through an exterior spacing ring 73, while the inner end of the sleeve is welded to a spacing ring 74 welded to the enlarged inner end of the torsion bar. The torsion member formed by the sleeve and bar is completely concealed and protected by the tube. It will be seen that in order for axle 65 to tilt on the supporting tube 61, it must twist the torsion member, whereby the tilting axle must overcome great resistance in order to rock on the tube.

By using running gear such as disclosed herein, tire wear and the possibility of accidents resulting from serious unequal tire deflection can be reduced.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A trailer running gear comprising a stiff tube adapted to extend lengthwise of an overlying trailer frame and to be connected to it, an axle housing encircling an end of the tube and rotatably mounted thereon, an axle secured to the housing and extending across the tube, the opposite ends of the axle being formed to receive wheels, a torsion bar disposed in said tube and projecting from said end, means rigidly connecting said axle housing with said projecting end of the bar, a cylindrical torsion member in the tube encircling said bar, means securing one end of said member to the end of the tube adjacent said axle housing and means securing the opposite end of said cylindrical torsion member to the bar.

2. A trailer running gear according to claim 1 in which said cylindrical torsion member is a metal sleeve.

References Cited by the Examiner

UNITED STATES PATENTS

| | | | |
|---|---|---|---|
| 2,702,701 | 2/55 | Thorne | 267—57 |
| 2,919,126 | 12/59 | Loehr | 267—57 |
| 2,942,871 | 6/60 | Krans | 267—57 |

MILTON BUCHLER, *Primary Examiner.*

A. HARRY LEVY, *Examiner.*